United States Patent
Cheon et al.

(10) Patent No.: US 8,894,117 B1
(45) Date of Patent: Nov. 25, 2014

(54) ROBOT FINGER DRIVING MODULE USING DIFFERENTIAL GEAR CHARACTERISTICS AND ROBOT HAND INCLUDING THE SAME

(71) Applicant: Korea Institute of Science and Technology, Seoul (KR)

(72) Inventors: Seyoung Cheon, Seoul (KR); Yonghwan Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 14/247,936

(22) Filed: Apr. 8, 2014

(30) Foreign Application Priority Data

Dec. 3, 2013 (KR) ......................... 10-2013-0149114

(51) Int. Cl.
  *B25J 15/08*  (2006.01)
  *B25J 15/02*  (2006.01)

(52) U.S. Cl.
  CPC ............ *B25J 15/0213* (2013.01); *Y10S 901/38* (2013.01)
  USPC ............................................ 294/106; 901/38

(58) Field of Classification Search
  CPC .. B25J 15/0009; B25J 15/0213; B25J 15/024; B25J 15/086; B25J 15/10; B25J 15/103; B25J 9/102; Y10S 901/38
  USPC ................. 294/106, 213; 901/38, 39; 623/64; 74/665 G, 665 GA, 665 GB
  See application file for complete search history.

(56) References Cited

U.S. PATENT DOCUMENTS

| | | | | |
|---|---|---|---|---|
| 3,572,807 A | * | 3/1971 | Haaker et al. ................. | 294/106 |
| 4,573,727 A | * | 3/1986 | Iikura ........................... | 294/115 |
| 5,342,254 A | * | 8/1994 | Sula .............................. | 475/230 |
| 7,556,299 B2 | * | 7/2009 | Koyama ........................ | 294/106 |
| 7,959,199 B2 | * | 6/2011 | Horiuchi et al. .............. | 294/106 |
| 8,597,370 B2 | * | 12/2013 | Wisse et al. .................... | 623/64 |
| 2003/0090115 A1 | * | 5/2003 | Kim et al. ..................... | 294/106 |

FOREIGN PATENT DOCUMENTS

| | | |
|---|---|---|
| KR | 10-0767721 B1 | 10/2007 |
| KR | 10-0873354 B1 | 12/2008 |
| KR | 10-1034203 B1 | 5/2011 |

OTHER PUBLICATIONS

Birglen, Lionel, et al. "Kinetostatic analysis of underactuated fingers." *Robotics and Automation, IEEE Transactions on* 20.2 (2004): 211-221.s.

Zhao, Deyano, et al. "Topology and analysis of three-phalanx COSA finger based on linkages for humanoid robot hands." *Intelligent Robotics and Applications*. Springer Berlin Heidelberg, 2010. 465-476.

SimLab "Allegro Hand Brochure" Published Sep. 30, 2012 at http://www.simlab.co.kr/Allegro-Hand.htm (2 pages in English).

\* cited by examiner

*Primary Examiner* — Dean Kramer
(74) *Attorney, Agent, or Firm* — NSIP Law

(57) ABSTRACT

A robot finger driving module is driven by a driving motor installed in a robot hand. The robot finger driving module receives a driving force of the driving motor by a pulley gear connected to the driving motor through a driving belt. When the robot finger driving module is fixed, a driving direction of a first output gear is opposite to a rotation-driving direction of a second output gear. When the robot finger driving module rotates, even though any one of the first output gear and the second output gear is fixed, the other is driven to rotate in the rotating direction of the robot finger driving module, thereby exhibiting differential gear characteristics.

6 Claims, 17 Drawing Sheets

(a)

(b)

ROBOT FINGER DRIVING MODULE USING DIFFERENTIAL GEAR CHARACTERISTICS AND ROBOT HAND INCLUDING THE SAME

CROSS-REFERENCE TO RELATED APPLICATION

This application claims priority to Korean Patent Application No. 10-2013-0149114, filed on Dec. 3, 2013 and all the benefits accruing therefrom under 35 U.S.C. §119, the contents of which in its entirety are herein incorporated by reference.

BACKGROUND

1. Field

The present disclosure relates to a robot finger driving module using differential gear characteristics and a robot hand including the same.

2. Description of the Related Art

Generally, a hand of an industrial robot is called a gripper, and the gripper represents a clip-type robot hand which is frequently used for gripping an article with the entire robot finger or robot hand.

Recently, as the interest in a robot hand for gripping an article is increasing, the design and operating algorithm of a robot finger to perfectly grip an article is intensively studied, and thus a robot hand having a plurality of robot fingers is being developed.

In addition, a robot similar to the human shape is being actively developed, and in order to operate a robot substantially in the same way as the human hand, fabricating a robot hand which is capable of giving power and driving force to every robot finger becomes a very important issue.

However, a robot hand having a plurality of fingers, recently developed, is concentrated just on a perfect gripping operation and ignores its size and easiness in operation, which results in too complicated structure.

For example, FIG. 17 schematically shows a robot hand (produced by SlimLab) generally commercialized.

The robot hand adopts a full-actuated manner in which a driving motor is applied to each joint 91 to 94 of a robot finger. Since this robot hand applies a single driving motor 921 to a single joint, each driving motor 921 has a limitation in its size and output.

In addition, due to the nature of the robot hand, the robot finger should have a small size, and a motor applied thereto should have a great output in comparison to its size in order to operate all robot fingers. In other words, the driving motor applied to each joint should give a great output in spite of its small size. Therefore, the driving motor of the above robot finger should have decelerator mechanisms 923 to 925.

Moreover, in order to solve the problem of the above robot finger, a robot hand using an under-actuated mechanism is being studied.

However, considering that the operation of the robot hand is not limited to simple gripping but should implement other operations such as pinching, hooking, palm contacting or the like, the robot hands which are being currently studied have insufficient functions.

SUMMARY

The present disclosure is directed to providing a robot finger driving module and a robot finger, which may sufficiently utilize the degree of freedom of each joint by using a differential gear in order to solve the existing problem in which an existing robot hand needs a plurality of driving motors according to the number of joints used.

In addition, the present disclosure is directed to providing a robot finger driving module and a robot finger, which may allow an entire robot hand system to have a light and small design, different from an existing robot hand which requires a plurality of driving motors and decelerators.

Moreover, the present disclosure is directed to providing a robot finger driving module and a robot finger, which may ensure sufficient toughness against to an external force applied to two output shafts by designing robot finger driving modules for operating robot fingers of different robot hands to have different output gears.

Further, the present disclosure is directed to providing a robot finger driving module and a robot finger, which may ensure a sufficient gripping force during a gripping operation by connecting each output shaft of the robot finger driving module by using a torsion spring, and may also sufficiently substitute for functions of a perfectly free system (gripping, pinching, hooking, compliance, and collision avoidance).

Moreover, the present disclosure is directed to providing a robot finger driving module and a robot finger, which may exhibit various characteristics of a robot hand by applying the robot finger driving modules in a parallel manner (for example, applying to two fingers in parallel) or in a series manner (for example, applying to each joint of a finger), or in a combination of the parallel manner and the series manner.

In one aspect, there is provided a robot finger driving module, which is driven by a driving motor installed in a robot hand. In addition, the robot finger driving module according to the present disclosure receives a driving force of the driving motor by a pulley gear connected to the driving motor through a driving belt, and the robot finger driving module includes a housing formed with a first module housing and a second module housing assembled with the pulley gear to be rotatable, a tri-axial driving shaft provided in the housing, first and third connection gears installed at upper and lower portions of the tri-axial driving shaft to be supported by bearings, second and fourth connection gears installed at front and rear portions of the tri-axial driving shaft to be supported by bearings, and first and second output gears installed at right and left portions of the tri-axial driving shaft to be supported by bearings. The tri-axial driving shaft is mounted in the housing of the robot finger driving module.

In addition, the first and second output gears are driven in engagement with the first to fourth connection gears, and when the robot finger driving module is fixed, a driving direction of the first output gear is opposite to a rotation-driving direction of the second output gear. Moreover, when the robot finger driving module rotates, even though any one of the first output gear and the second output gear is fixed, the other is driven to rotate in the rotating direction of the robot finger driving module, thereby exhibiting differential gear characteristics.

In addition, in the robot finger driving module of the present disclosure, a torsion spring may be formed around the tri-axial driving shaft in the housing, and the first and second output gears may have different gear ratios from each other.

In another aspect, there is provided a robot hand, which uses the above robot finger driving module. An output pulley and an output belt for transferring a driving force of the output pulley are respectively formed at outer sides of a first output gear and a second output gear of a central finger module, and a first finger module and a second finger module are installed in parallel at both ends of the central finger module. In addition, the output belt is connected to pulley gears of the first finger module and the second finger module, and the central finger module, the first finger module and the second finger module exhibit the differential gear characteristics.

In addition, in the robot hand of the present disclosure, one of the output gears of the first finger module and the second finger module may be connected to a joint connection unit, the other output gear may be connected to a branch connection unit through a belt, a branch connection unit may be formed at the other terminal of the joint connection unit through a joint gear, and the branch connection unit may be connected to a four-bar linkage to drive a finger terminal.

Moreover, the robot hand of the present disclosure may further include tension springs provided at an outer side of the joint connection unit and an outer side of the branch connection unit.

According to the present disclosure, since differential gear characteristics are used, the degree of freedom of each joint may be sufficiently utilized, and since there a plurality of driving motors and decelerators is not needed, different from an existing robot hand, it is possible to allow the entire robot hand system have a light and small design.

In addition, since the robot finger driving modules of the present disclosure have different output gears, it is possible to sufficiently ensure toughness against to an external force applied to two output shafts.

Moreover, a restoring force may be easily ensured through a torsion spring provided in the robot finger driving module of the present disclosure, and functions such as gripping, pinching, hooking, compliance, collision avoidance or the like may be sufficiently exhibited.

Further, various characteristics of a robot hand may be exhibited by applying the robot finger driving module of the present disclosure in a parallel manner or in a series manner, or in combination of the parallel and series manners.

BRIEF DESCRIPTION OF THE DRAWINGS

The above and other aspects, features and advantages of the disclosed exemplary embodiments will be more apparent from the following detailed description taken in conjunction with the accompanying drawings in which.

Figure 1:
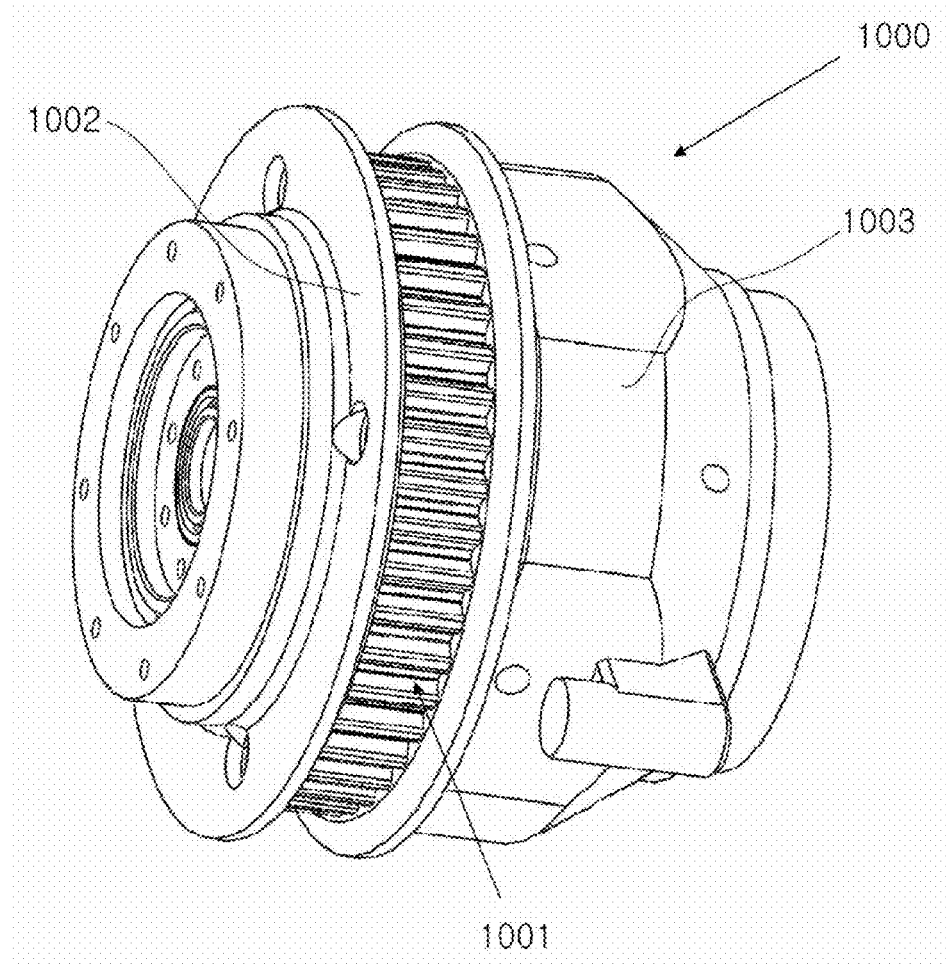
FIG. 1 is a perspective view showing a robot finger driving module according to an embodiment of the present disclosure.

DETAILED DESCRIPTION OF MAIN ELEMENTS 1000 robot finger driving module
1001 pulley gear
1002 second module housing
1003 first module housing
1004 driving shaft
1005 first connection gear
1006 fourth connection gear
1007 third connection gear
1008 second connection gear
1009, 721 second output gear
1010, 731 first output gear
1011 bearing
71 robot finger driving module input shaft
72 robot finger driving module first output shaft
73 robot finger driving module second output shaft
A, B gear train
1 robot hand
10, 70 central finger module
111, 113, 726 output pulley
112, 114 output belt
20 first finger module
30 second finger module
21, 31, 722, 732 joint connection unit
23, 33 branch connection unit
231, 331 four-bar linkage
211, 311, 83 output belt
22, 32, 80 joint gear
25, 35 finger terminal
60 driving motor
62 driving motor output gear

DETAILED DESCRIPTION

Hereinafter, a robot finger driving module and a robot hand according to the present disclosure will be described based on embodiments of the present disclosure with reference to the accompanying drawings.

Prior to the description, in various embodiments, like elements are denoted by like reference numerals and representatively described in an embodiment, and other embodiments describe only other elements.

FIG. 1 is a perspective view schematically showing a robot finger driving module 1000 according to an embodiment of the present disclosure. As shown in FIG. 1, the robot finger driving module 1000 of the present disclosure includes a pulley gear 1001 formed at its center portion. The pulley gear 1001 may rotate with a driving force transmitted from an external driving source (not shown), and the pulley gear 1001 is integrated with a second module housing 1002.

A first module housing 1003 is formed at the opposite side of the second module housing 1002, and the second module housing and the first module housing 1003 are coupled to configure the entire robot finger driving module 1000.

Figure 2:
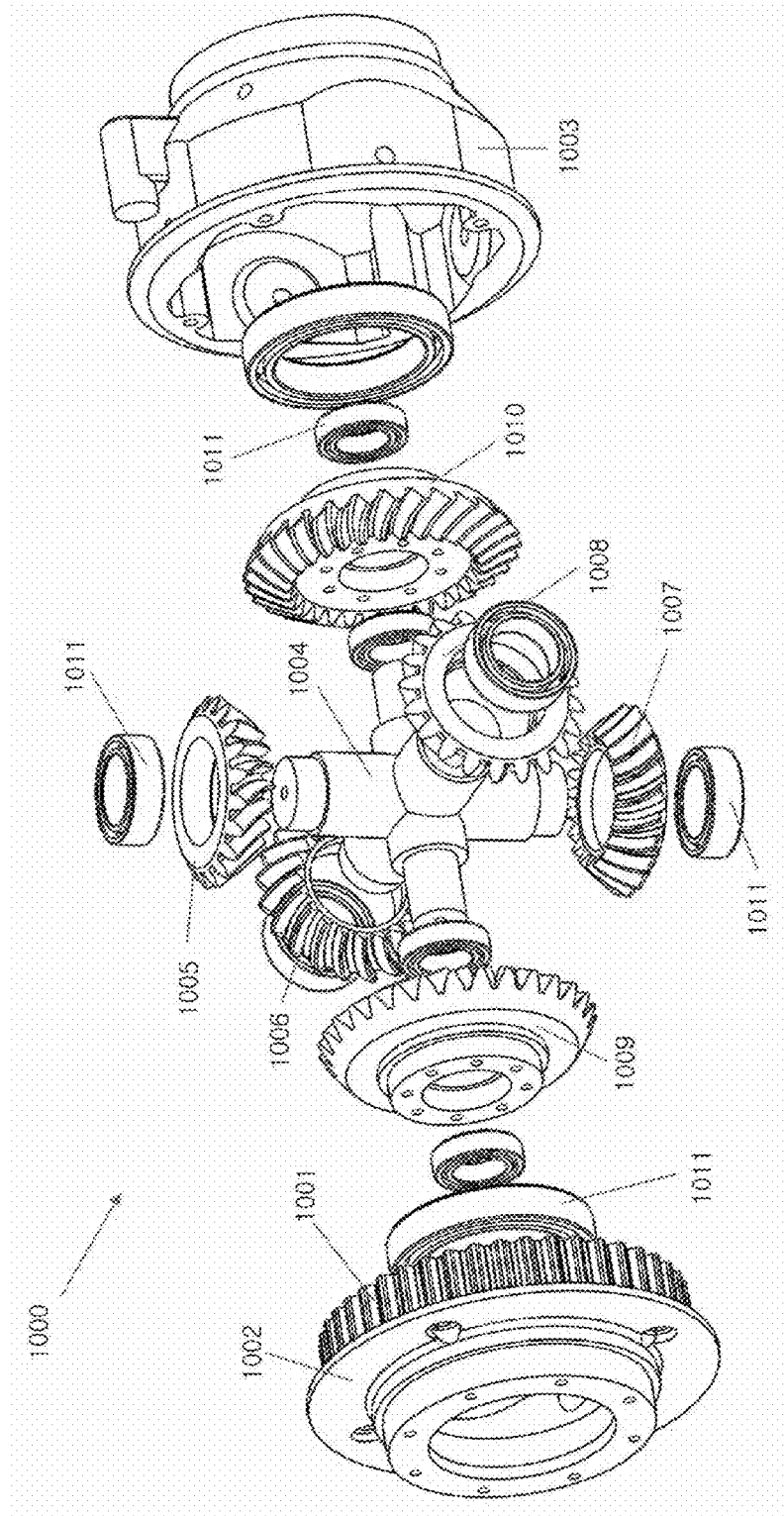
FIG. 2 is an exploded perspective view showing the robot finger driving module of FIG. 1 according to an embodiment of the present disclosure.

FIG. 2 is an exploded perspective view showing the robot finger driving module of FIG. 1 according to an embodiment of the present disclosure, which is obtained by exploding the robot finger driving module 1000 of FIG. 1.

As shown in FIG. 2, a tri-axial driving shaft 1004 is located at the center of the robot finger driving module 1000, and connection gears 1005, 1006, 1007, 1008 are respectively coupled to terminals of the tri-axial driving shaft 1004. In more detail, the first connection gear 1005 is connected to the upper portion of the tri-axial driving shaft 1004 and the third connection gear 1007 is connected to the lower portion thereof, respectively to be supported by bearings 1011. In addition, the second connection gear 1008 is connected to the front side (based on the drawing) of the tri-axial driving shaft 1004 and the fourth connection gear 1006 is connected to the rear side thereof, respectively to be supported by bearings. Moreover, a second output gear 1009 is connected to the left side of the tri-axial driving shaft 1004 to be supported by a bearing, and a first output gear 1010 is connected to the right side thereof to be supported by a bearing. Further, the second module housing 1002 is supported at the outer side of the second output gear 1009 by a bearing 1011.

The rotation-driving method will be described in detail. When the pulley gear 1001 is rotating, the entire robot finger driving module 1000 rotates, and the tri-axial driving shaft 1004 therein also rotates together. In addition, if the first to fourth connection gears 1005 to 1008 are driven to rotate, the first output gear 1010 and the second output gear 1009 engaged with the first to fourth connection gears 1005 to 1008 are driven to rotate.

At this time, if the entire robot finger driving module 1000 is fixed, the driving direction of the first output gear 1010 becomes opposite to the rotation-driving direction of the second output gear 1009.

In addition, if the robot finger driving module 1000 rotates, even though one of the first output gear 1010 and the second output gear 1009 is fixed, the other is driven to rotate in the rotating direction of the robot finger driving module 1000, which exhibits differential gear characteristics.

Hereinafter, with reference to the diagram of the robot finger driving module 1000 depicted in FIG. 3, operations of the robot finger driving module according to an embodiment of the present disclosure will be described.

Figure 3:
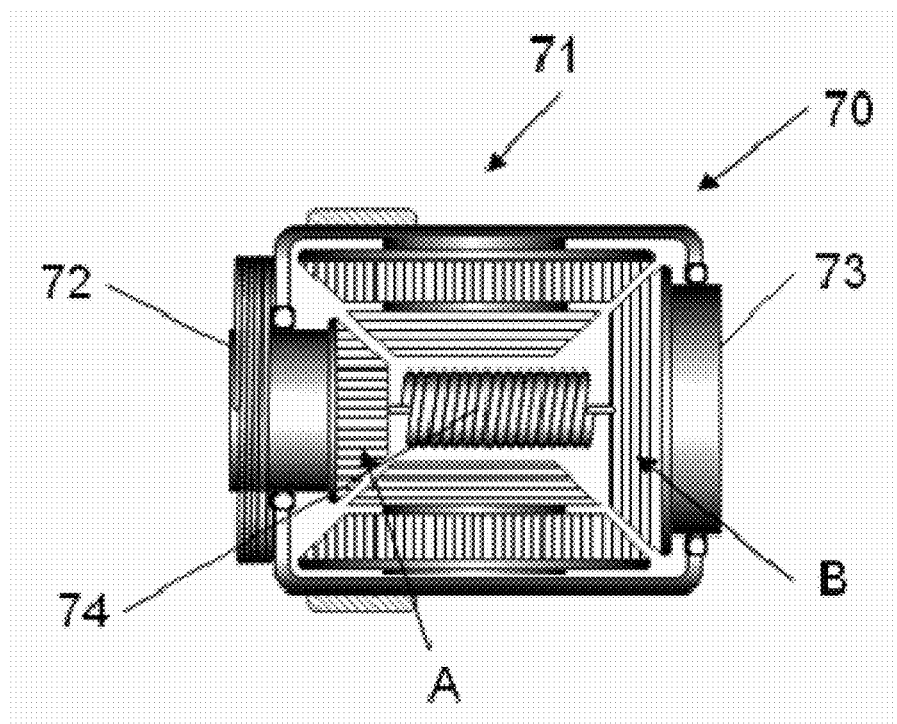
FIG. 3 is a diagram showing the robot finger driving module of FIGS. 1 and 2 according to an embodiment of the present disclosure.

FIG. 3 shows an input shaft 71, a first output shaft 72 and a second output shaft 73 of the robot finger driving module, and the numbers of gear trains of the first output gear 1010 and the second output gear 1009 are respectively denoted by A and B.

In addition, as an embodiment of the present disclosure, a torsion spring 74 may be added around the tri-axial driving shaft 1004 in the robot finger driving module 1000, and the torsion spring 74 connects the first output gear 1010 and the second output gear 1009. Detailed operations of the torsion spring 74 will be described later.

Figure 4:
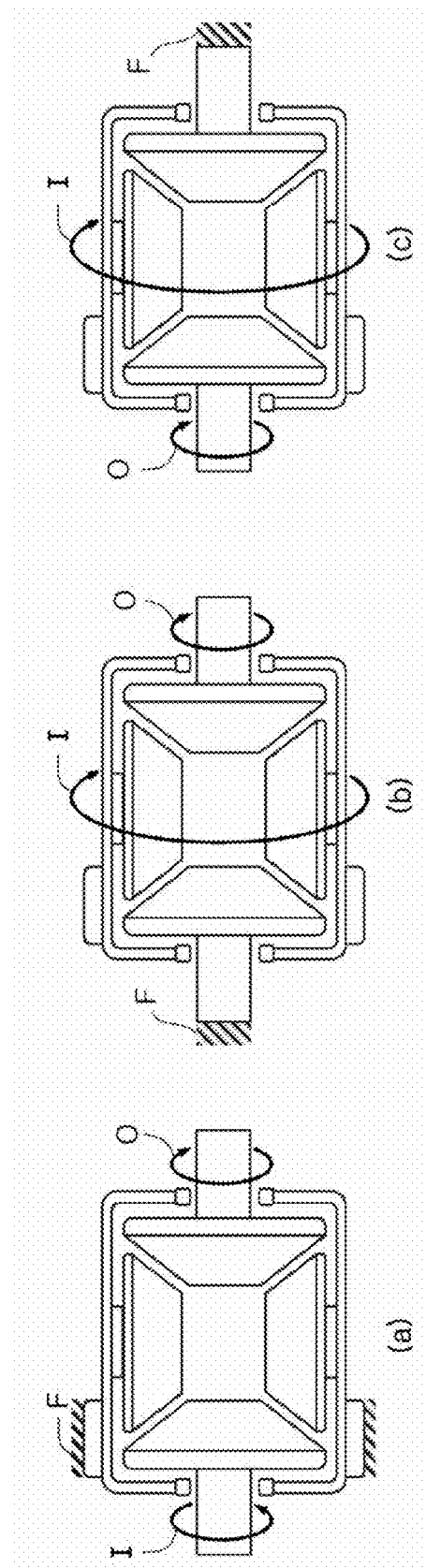
FIG. 4 is a diagram for illustrating operations of the robot finger driving module of FIG. 3 according to an embodiment of the present disclosure.

FIG. 4(a) shows an operation relation between the output shafts 72, 73 of the robot finger driving module when the input shaft 71 is fixed (F). As shown in FIG. 4(a), when the input shaft 71 of the robot finger driving module is fixed (F), for example if a rotation-driving force is input (I) to the first output shaft 72, the second output shaft 73 outputs (0) a rotation-driving force in a direction opposite to the first output shaft 72.

In addition, as shown in FIG. 4(b), for example, when the first output shaft 72 is fixed (F), if a rotation-driving force is input (I) to the input shaft 71 of the robot finger driving module, the second output shaft 73 outputs (0) a rotation-driving force, separate from the input shaft 71 of the robot finger driving module.

In addition, as shown in FIG. 4(c), for example, when the second output shaft 73 is fixed (F), if a rotation-driving force is input (I) to the input shaft 71 of the robot finger driving module, the first output shaft 72 outputs (0) a rotation-driving force, separate from the input shaft 71 of the robot finger driving module.

In other words, as seen from the operations of FIGS. 4(a) to 4(c), a single driving motor module 70 may give three kinds of rotation patterns, which improves the degree of freedom as much.

In addition, if the gear ratios of the first output gear 1010 and the second output gear 1009 are changed, a rotation-driving amount different from the rotation-driving amount of the first output gear 1010 may be given to the second output gear 1009.

Hereinafter, an embodiment of a robot hand 1 to which the robot finger driving module 1000 depicted in FIGS. 1 to 4 is applied will be described with reference to FIGS. 5 to 9.

Figure 5:
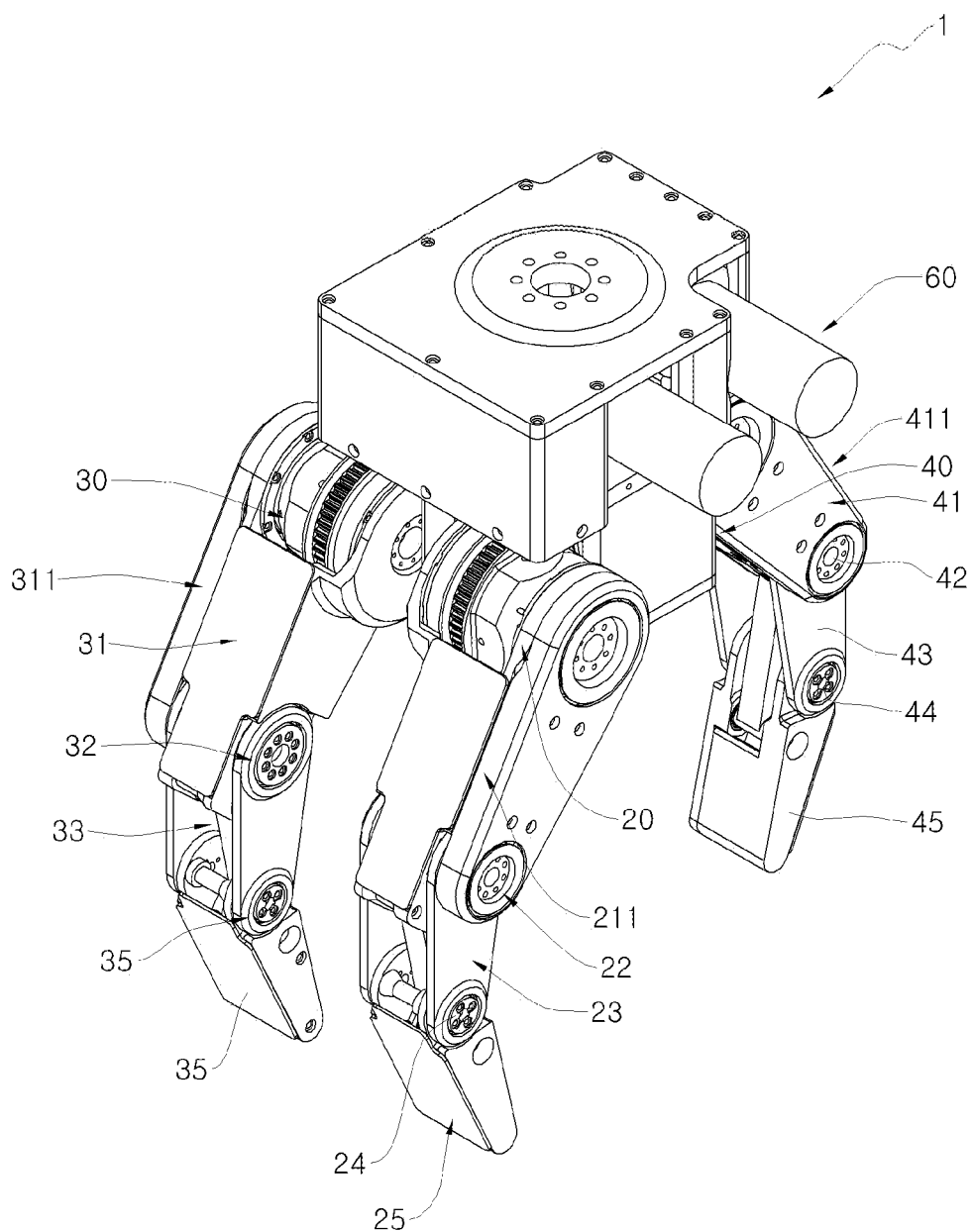
FIG. 5 is a perspective view showing a robot hand to which the robot finger driving module is applied according to an embodiment of the present disclosure.
Figure 6:
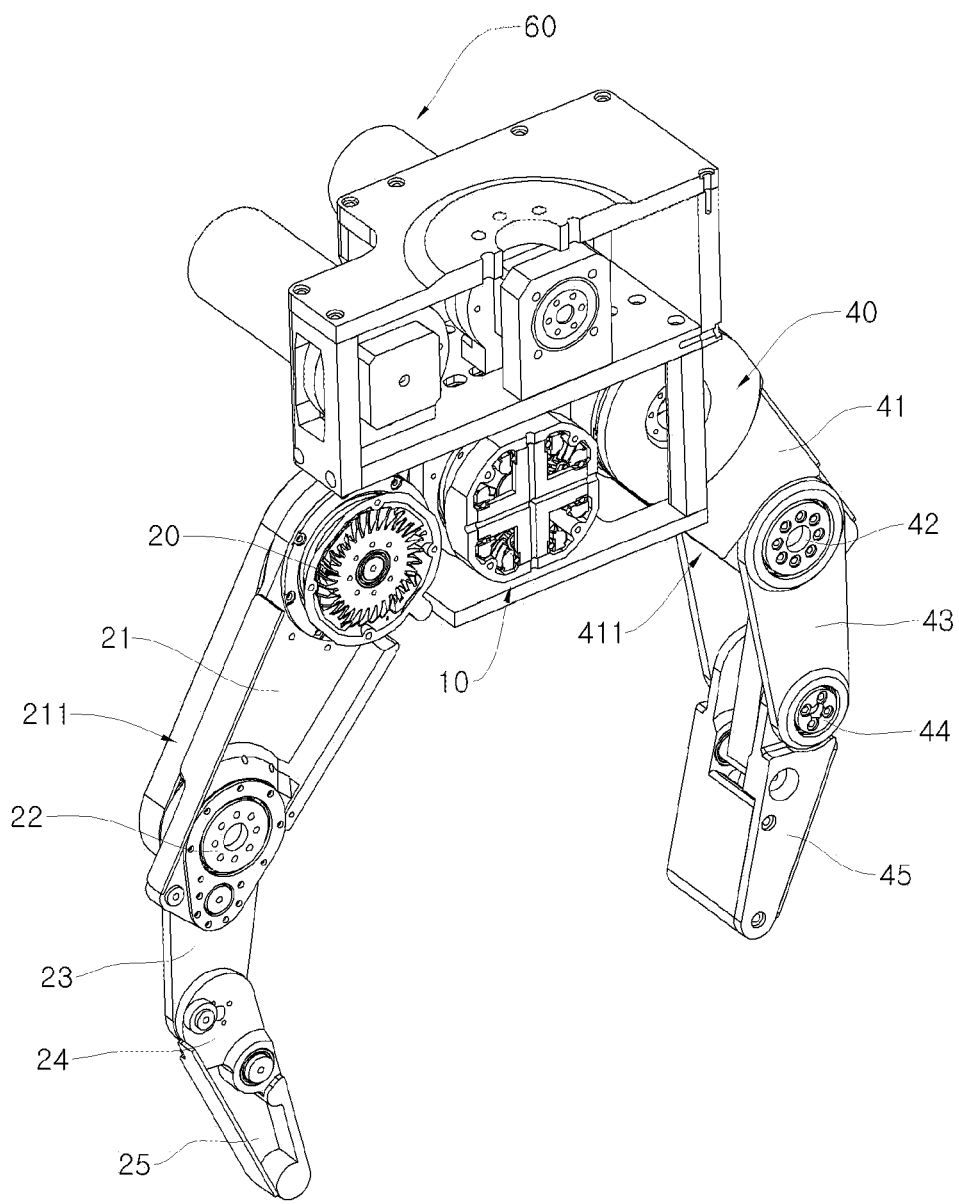
FIG. 6 is a cross sectional view showing the robot hand of FIG. 5 according to an embodiment of the present disclosure.
Figure 7:
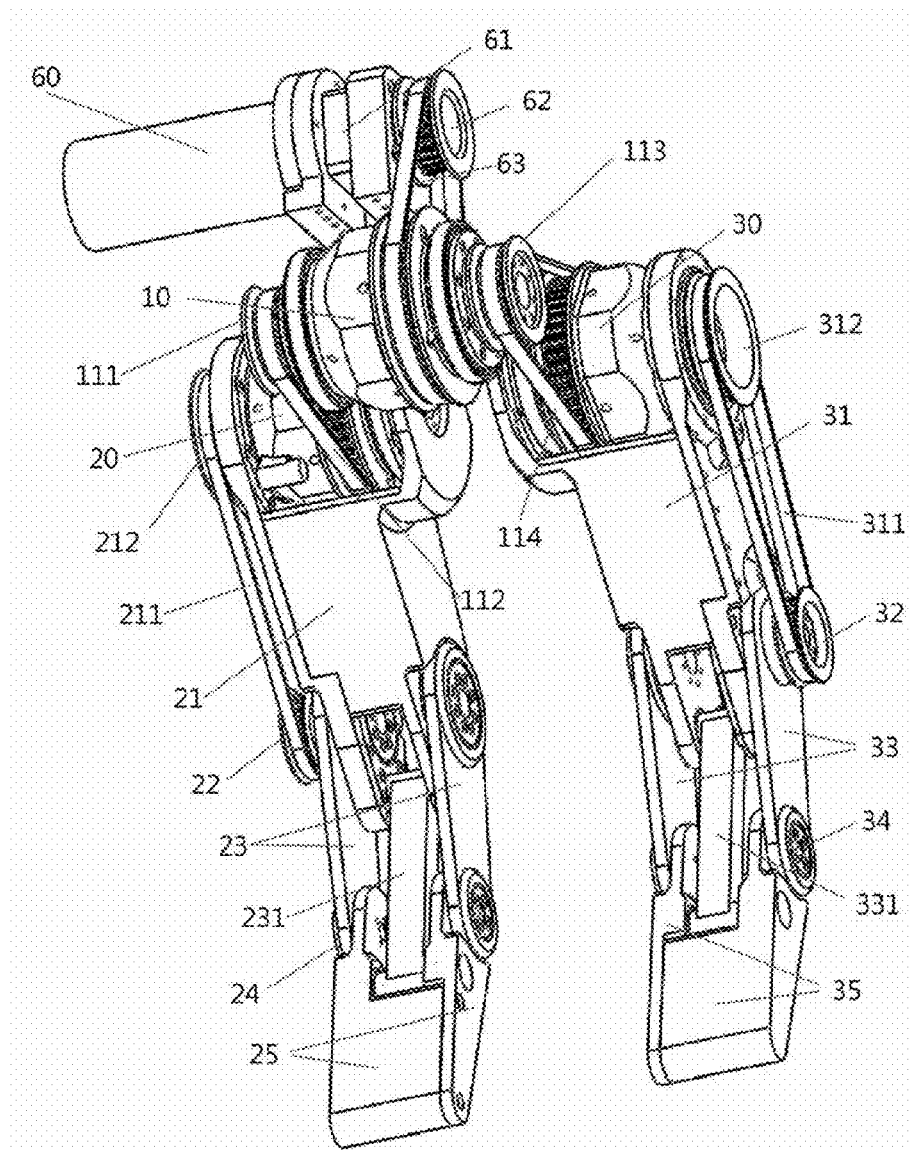
FIG. 7 is a perspective view showing a parallel connection of the robot finger driving module of FIG. 5, observed in another view, according to an embodiment of the present disclosure, from which the transfer of a driving force when two robot finger driving modules are connected in parallel may be understood.

As shown in FIG. 5, the robot hand 1 according to an embodiment of the present disclosure includes the robot finger driving module 10 located at its center, and robot fingers are respectively connected to the first output gear 1010 and the second output gear 1009 of the central finger module 10. In addition, the robot hand 1 includes the robot finger driving module 1000 therein, respectively.

In more detail, an output pulley 111 and an output belt 112 are formed at the outer side of the first output gear 1010 of the central finger module 10, and the driving force of the first output gear 1010 is transferred through the output belt 112 to a pulley gear of a first finger module 20. Moreover, an output pulley 113 and an output belt 114 are also formed at the outer side of the second output gear 1009 at the other side of the central finger module 10, and the driving force of the second output gear 1009 is transferred through the output belt 114 to a pulley gear of a second finger module 30.

As described above, since the first output gear 1010 and the second output gear 1009 exhibit differential gear characteristics, if the central finger module 10 is fixed, the pulley gear of the first finger module 20 receiving a driving force therefrom may have a driving direction opposite to that of the pulley gear of the second finger module 30.

In addition, if the central finger module 10 rotates, even though any one of the first finger module 20 and the second finger module 30 is fixed, the other is driven to rotate in the rotating direction of the central finger module 10.

Moreover, any one of the output gears of the first finger module 20 is connected to a joint connection unit 21, and the other output gear is connected through an output belt 211 to a branch connection unit 23.

In addition, a joint gear 22 is formed at the other terminal of the joint connection unit 21, so that the branch connection unit 23 is connected to the joint connection unit 21 through the joint gear 22. Moreover, the driving force output from the first finger module 20 is transferred to the branch connection unit 23 through the output belt 211, and the branch connection unit 23 is connected to a four-bar linkage 231 to drive a finger terminal 25.

In addition, similar to the above, one of the output gears of the second finger module 30 is connected to a joint connection unit 31, and the other output gear is connected through an output belt 311 to a branch connection unit 33.

Moreover, a joint gear 32 is formed at the other terminal of the joint connection unit 31, so that the branch connection unit 33 is connected to the joint connection unit 31 through the joint gear 32. In addition, the driving force output from the second finger module 30 is transferred to the branch connection unit 33 through the output belt 311, and the branch connection unit 33 is connected to a four-bar linkage 331 to move a finger terminal 35.

In addition, as shown in FIG. 5, the robot hand 1 according to the present disclosure may include an additional robot finger driving module 1000 formed at a side opposite to the first finger module 20 and the second finger module 30, so that an additional third finger module is formed. In other words, the robot hand 1 according to the present disclosure as described in FIG. 5 may be a robot hand having three robot fingers.

Hereinafter, by using the diagrams of FIGS. 10 to 16 showing the robot finger 1 according to the present disclosure, each embodiment will be described. For the description, the diagrams use reference numerals different from those of FIGS. 5 to 9.

Figure 10:
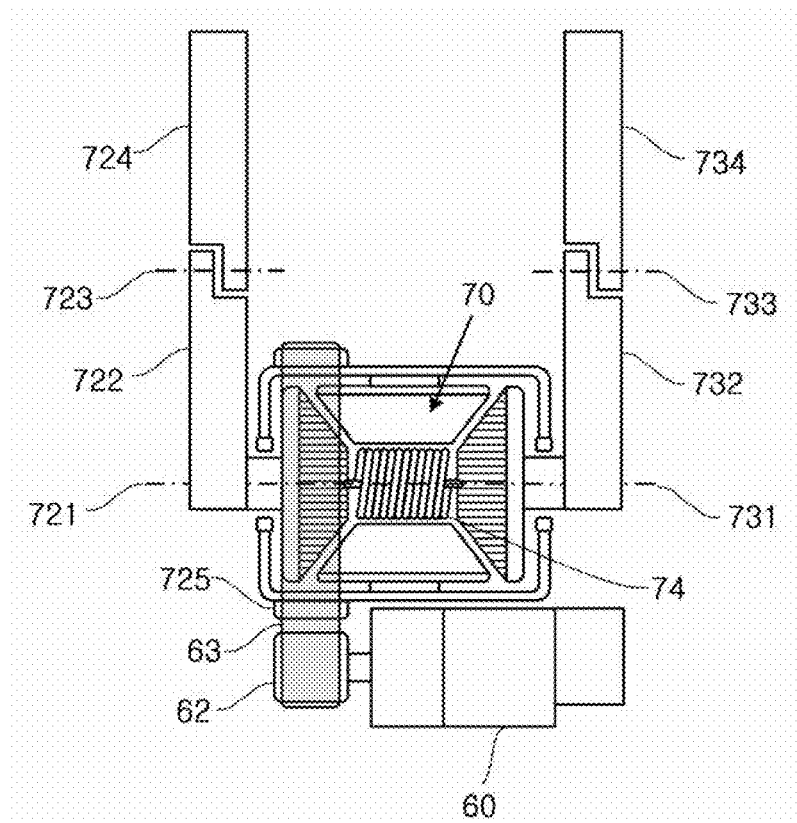
FIG. 10 is a diagram showing a parallel connection of the robot finger driving modules of FIG. 8 according to an embodiment of the present disclosure.

First, as shown in FIG. 10, an output gear 62 is formed at one end of a driving motor 60, and the output gear 62 is connected to a pulley gear 725 of a central robot finger driving module 70, so that a driving force of the driving motor 60 is transferred to the robot finger driving module 70.

Figure 11:
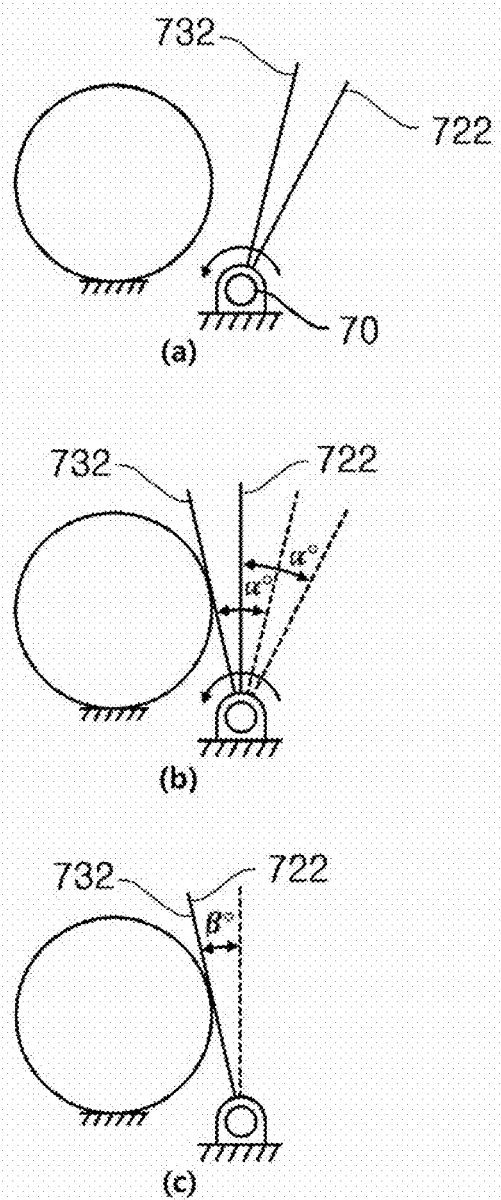
FIG. 11 is a schematic view for illustrating operations of the parallel connection of the robot finger driving modules of FIG. 10 according to an embodiment of the present disclosure.

Since the central robot finger driving module 70 exhibits differential gear characteristics as described above, a first output gear 731 and a second output gear 721 connected in parallel exhibit differential gear characteristics. Referring to the diagram of FIG. 11 together, even though a joint connection unit 732 connected to the first output gear 731 contacts a work piece so that the first output gear 731 stops rotating, since the second output gear 721 exhibits differential gear characteristics, separate from the first output gear 731, the joint connection unit 722 of the second output gear 721 rotates separate from the joint connection unit 732 of the first output gear 731 until contacting the work piece. In other words, in FIGS. 11(a) and 11(b), by driving the central robot finger 70, the first joint connection unit 732 and the second joint connection unit 722 are driven together (a), and in FIG. 11(b), the first joint connection unit 732 contacts a work piece first and then stops. After that, as shown in FIG. 11(c), due to the differential gear characteristics of the robot finger driving module 70 of the present disclosure, even though the first joint connection unit 732 stops, the second joint connection unit 722 is separately driven (13) to rotate until stopping due to the contact with the work piece.

At this time, if the first output gear 731 and the second output gear 721 have the same gear ratio, at an initial stage, the same angular speed will be applied to the first joint connection unit 732 and the second joint connection unit 722 (a). However, if the first output gear 731 and the second output gear 721 have different gear ratios, their angular speeds may be different from each other.

Next, referring to FIG. 12, operations when the robot finger driving modules of the present disclosure are arranged in series will be described. First, similar to FIG. 10, the driving motor 60 is connected to the central robot finger driving module 70. However, different from FIG. 10, an output pulley 726 is formed at a location of the first output gear 731, and a driving force is transferred through an output belt 83 and a joint gear 80 formed at the terminal of the joint connection unit 722. As described above, in the embodiment of the present disclosure depicted in FIG. 12, the robot finger driving modules are arranged in series.

Hereinafter, the operations of FIG. 12 will be described with reference to FIG. 13. First, by driving the central robot finger driving module 70, the joint connection unit 722 is driven (FIG. 13(a)). In FIG. 13(b), even though the joint connection unit 722 contacts a work piece and stops driving, the joint gear 80 at the terminal of the joint connection unit 722 keeps rotating. Therefore, as shown in FIG. 13(c), a branch connection unit 822 may be additionally driven (y).

Figure 12:
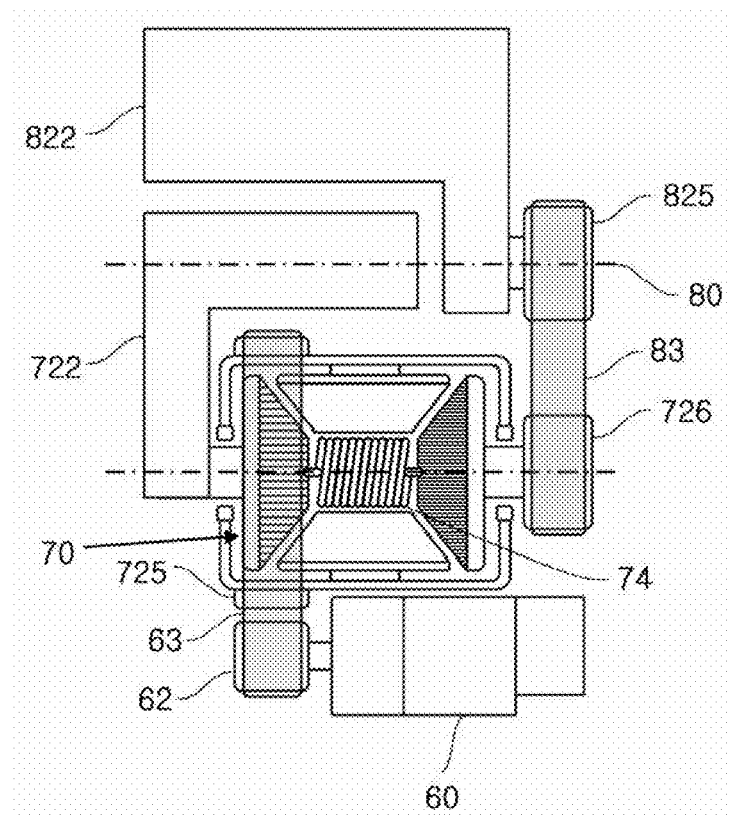
FIG. 12 is a schematic view showing that the robot finger driving modules of the present disclosure are connected in series according to an embodiment of the present disclosure.
Figure 13:
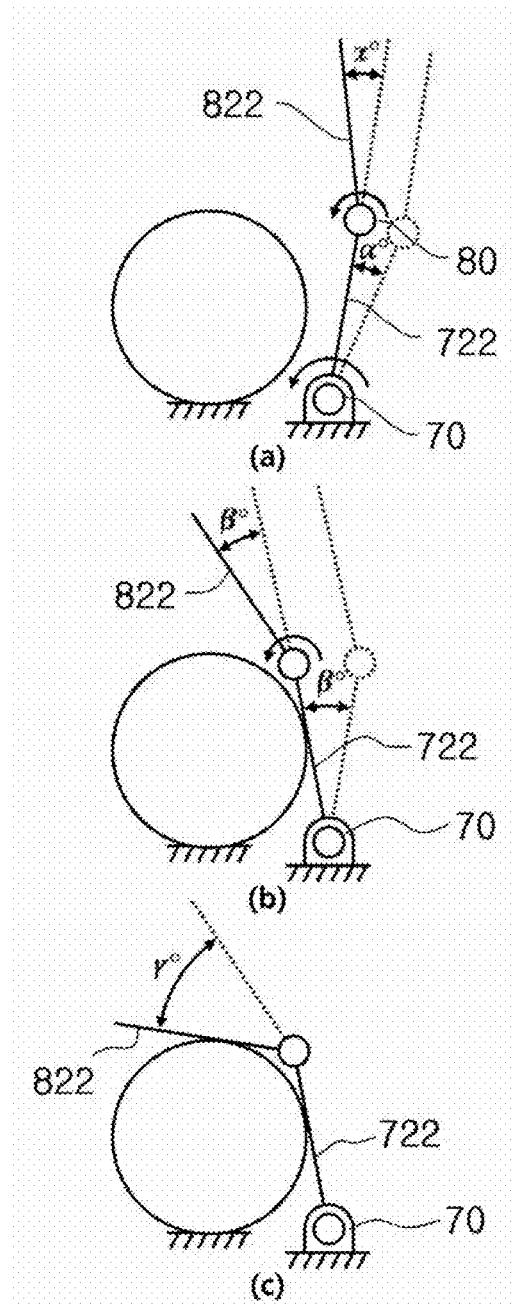
FIG. 13 is a schematic view for illustrating operations of the series connection of the robot finger driving modules of FIG. 12 according to an embodiment of the present disclosure.
Figure 14:
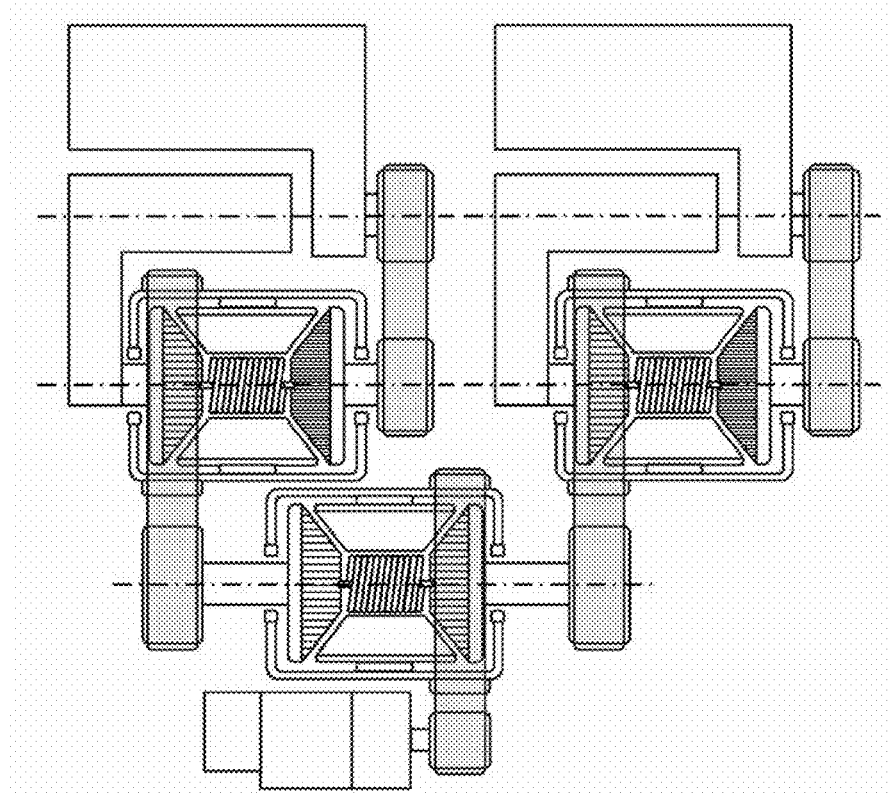
FIG. 14 is a schematic view showing that the robot finger driving modules of the present disclosure are connected both in parallel and in series according to an embodiment of the present disclosure.

Next, the embodiment in which both the robot finger driving modules arranged in parallel as shown in FIG. 10 and the robot finger driving modules arranged in series as shown in FIG. 12 are applied is depicted in FIG. 14. Since detailed components of FIG. 14 have fully described above with reference to FIGS. 10 and 12, they are not described in detail here.

Figure 15:
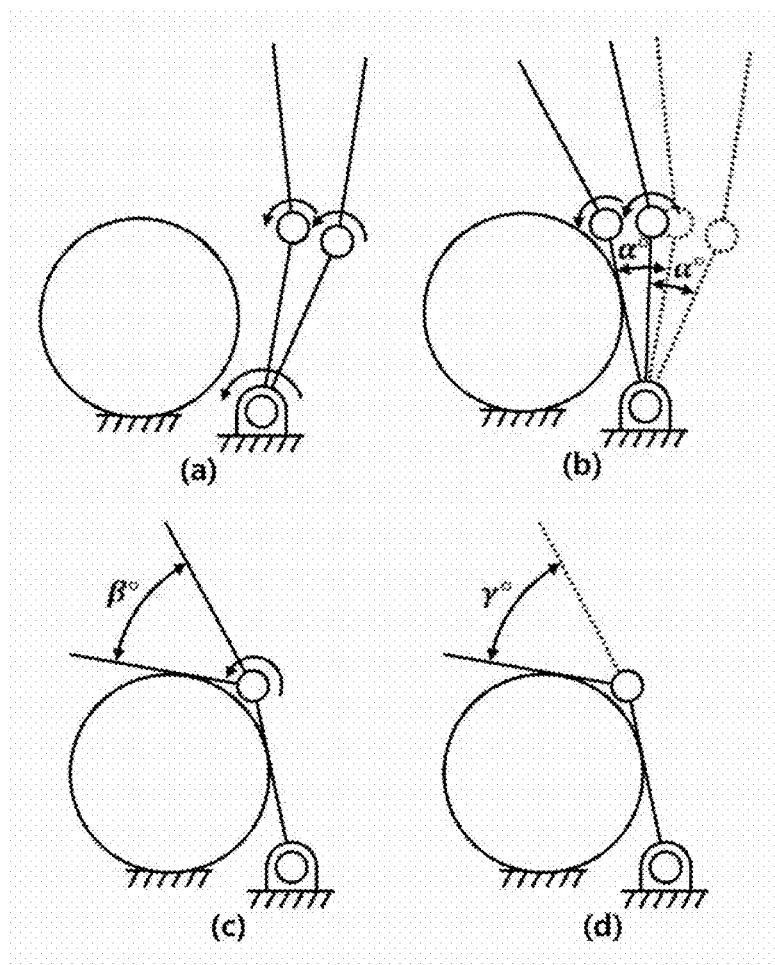
FIG. 15 is a schematic view for illustrating operations of the robot hand of FIG. 14 according to an embodiment of the present disclosure.

FIG. 15 shows operations of the robot finger driving modules arranged both in parallel and in series, depicted in FIG. 14. At this time, the robot finger driving modules depicted in FIG. 14 employ the operations of the robot finger driving modules depicted in FIGS. 11 and 13 in combination and sufficiently exhibit the degree of freedom since four kinds of finger operations may be provided with a single driving motor 60.

At this time, if the robot finger driving module does not include the torsion spring 74 therein, after the output shaft is fixed, a torque required for rotating the joint gear is identical. However, since the robot finger driving module of the present disclosure includes the torsion spring 74 therein, the output torque of the joint gear requires further torque as much as the torque by the torsion spring 74 in comparison to the torque of the fixed output shaft.

However, even though a general robot hand additionally requires a sensor for detecting an initial location of a finger when the finger returns to its original location, the robot hand adopting the robot finger driving module of the present disclosure may return to its original location more easily since the restoring force is reduced through the spring force of the torsion spring 74.

Figure 8:
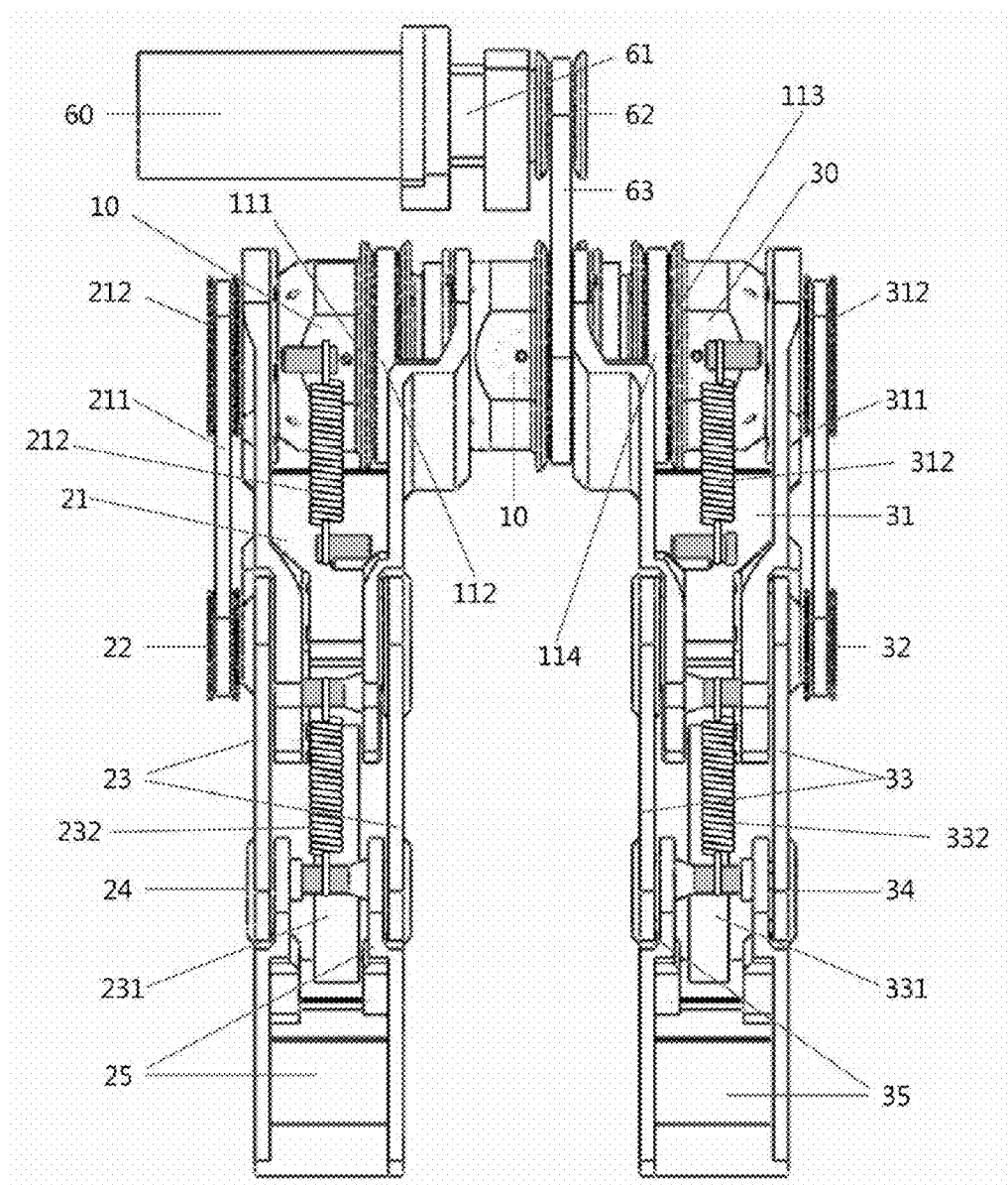
FIG. 8 is a front view showing the robot hand of FIG. 7 according to an embodiment of the present disclosure.
Figure 9:
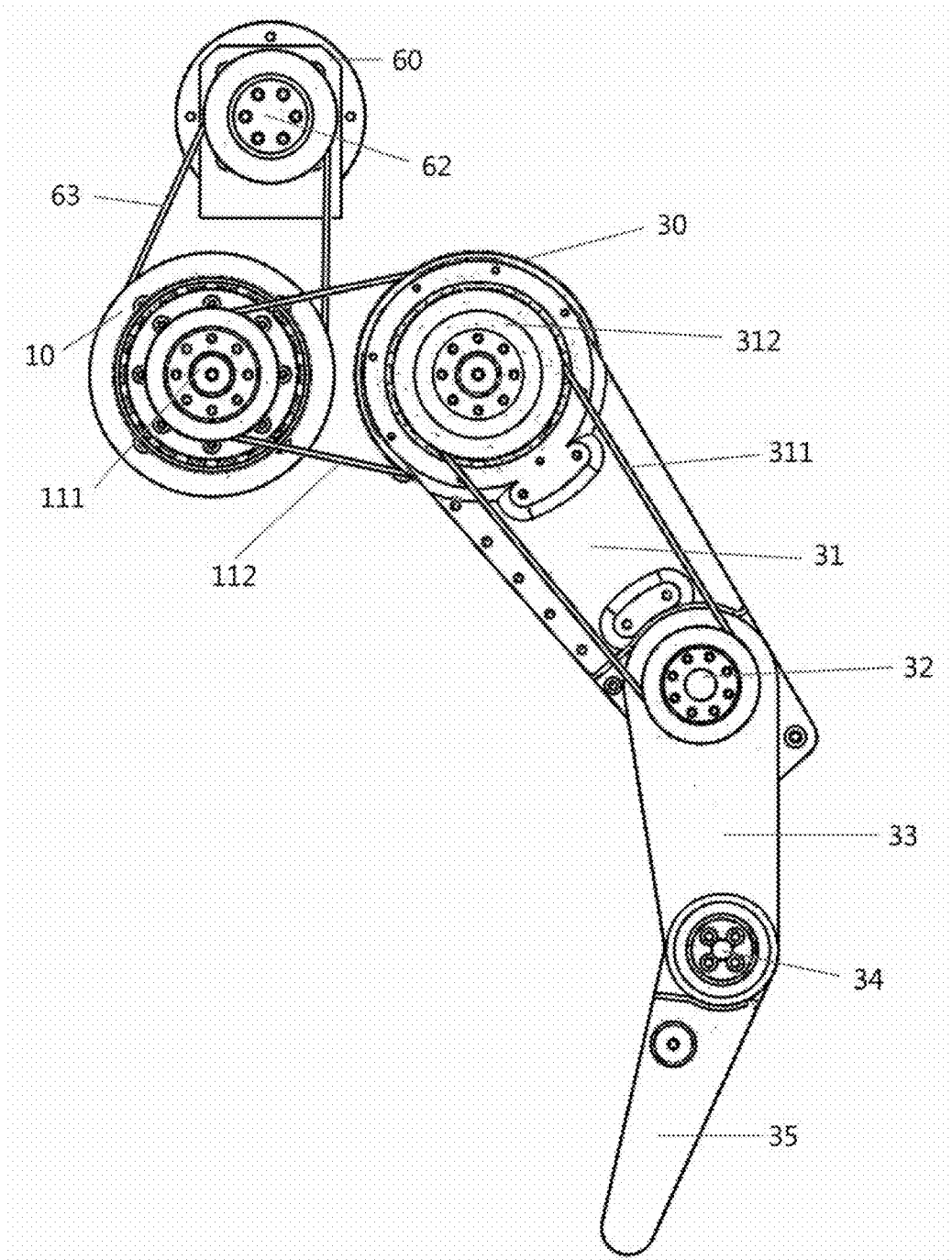
FIG. 9 is a sectional side view showing the robot hand of FIG. 8 according to an embodiment of the present disclosure.

In addition, the role of the torsion spring 74 in the robot finger driving module may also be played through a connection spring 212 as shown in FIG. 8.

Hereinafter, functions of the robot hand adopting the robot finger driving module of the present disclosure will be described with reference to FIG. 16.

(a) Grasping

The gripping function depicted in FIG. 16(a) may be implemented by additionally forming a third robot finger and a fourth robot finger to the robot finger driving module depicted in FIG. 14.

(b) Pinching

If a work piece is placed between an index finger and a thumb of the robot finger, the work piece may be pinched using the robot finger of the present disclosure. At this time, if the pinched work piece is shaken by an external force, the work piece may not be fixed between fingers due to the differential gear characteristics of the present disclosure. However, since the present disclosure uses the torsion spring 74 and the connection spring 212 so that the tip of the finger contacting the work piece presses the work piece more strongly by using the elasticity of the torsion spring 74 and the connection spring 212 as described above, the robot hand may maintain the pinching state within a certain range due to the elasticity of the torsion spring 74 and the connection spring 212 (FIG. 16(*b*)).

(c) Hooking

Figure 16:
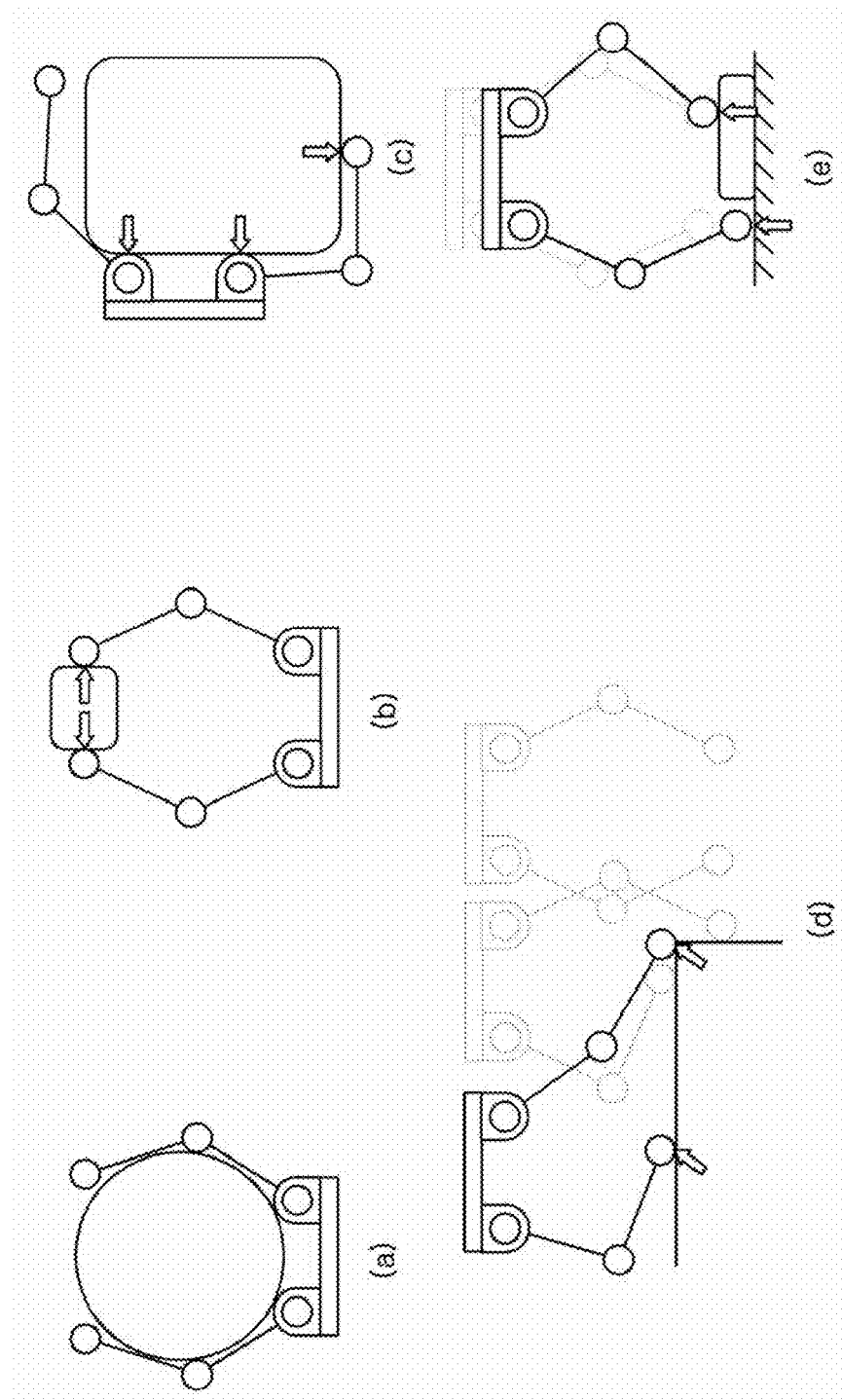
FIG. 16 is a schematic view for illustrating various operations using the robot hand of the present disclosure according to an embodiment of the present disclosure.
Figure 17:
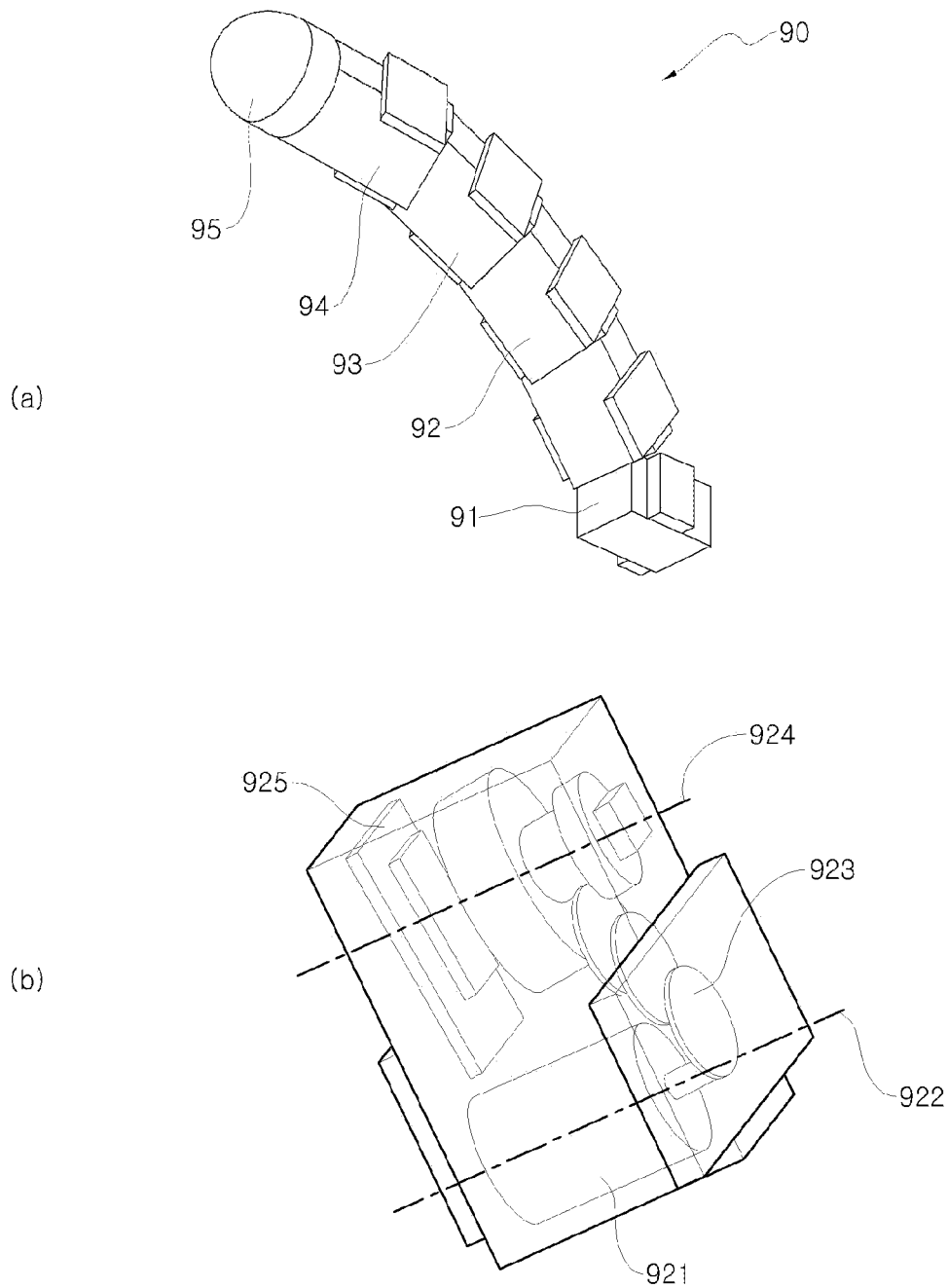
FIG. 17 is a perspective view schematically showing a general robot hand.

As shown in FIG. 16(*c*), if an edge of the work piece contacts the joint connection unit and does not contact the corresponding branch connection unit, the robot hand of the present disclosure has a hooking function. On the contrary, if the work piece contacts the palm of the robot hand and has no portion contacting the branch connection unit earlier than the joint connection unit of the robot finger, or if all of them contact the work piece, the robot hand has a palm contacting function.

(d) Collision Avoidance and Compliance

In the robot hand field, the compliance function means mechanical toughness of the robot hand without any additional operation control to an unintended external force when the robot hand plays a main function. In other words, FIG. 16(*e*) exemplarily shows compliance with respect to a work piece which deviates from a location where pinching is available, and the robot hand should return to an initial location after failing the pinching function. At this time, the joint connection unit returns to its initial location by means of the differential gear characteristics, and after ensuring the initial location of the joint connection unit, the branch connection unit returns to its initial location by the restoring force of the torsion spring 74 and the connection spring 212.

In addition, the collision avoidance depicted in FIG. 16(*d*) also uses the operations of the joint connection unit and the branch connection unit, which return to their initial locations, when colliding with an obstacle, similar to the compliance function.

What is claimed is:

1. A robot finger driving module, which is driven by a driving motor installed in a robot hand, wherein the robot finger driving module receives a driving force of the driving motor by a pulley gear connected to the driving motor through a driving belt, wherein the robot finger driving module includes a housing formed with a first module housing and a second module housing assembled with the pulley gear to be rotatable, a tri-axial driving shaft provided in the housing, first and third connection gears installed at upper and lower portions of the tri-axial driving shaft to be supported by bearings, second and fourth connection gears installed at front and rear portions of the tri-axial driving shaft to be supported by bearings, and first and second output gears installed at right and left portions of the tri-axial driving shaft to be supported by bearings, wherein the tri-axial driving shaft is mounted in the housing of the robot finger driving module, wherein the first and second output gears are driven in engagement with the first to fourth connection gears, wherein when the robot finger driving module is fixed, a driving direction of the first output gear is opposite to a rotation-driving direction of the second output gear, and wherein when the robot finger driving module rotates, even though any one of the first output gear and the second output gear is fixed, the other is driven to rotate in the rotating direction of the robot finger driving module, thereby exhibiting differential gear characteristics.

2. The robot finger driving module according to claim 1, wherein a torsion spring is formed around the tri-axial driving shaft in the housing.

3. The robot finger driving module according to claim 1, wherein the first and second output gears have different gear ratios from each other.

4. A robot hand, which uses the robot finger driving module defined in any one of the claim 1, wherein an output pulley and an output belt for transferring a driving force of the output pulley are respectively formed at outer sides of a first output gear and a second output gear of a central finger module, wherein a first finger module and a second finger module are installed in parallel at both ends of the central finger module, wherein the output belt is connected to pulley gears of the first finger module and the second finger module, and wherein the central finger module, the first finger module and the second finger module exhibit the differential gear characteristics.

5. The robot hand according to claim 4, wherein one of the output gears of the first finger module and the second finger module is connected to a joint connection unit, and the other output gear is connected to a branch connection unit through a belt, wherein a branch connection unit is formed at the other terminal of the joint connection unit through a joint gear, and wherein the branch connection unit is connected to a four-bar linkage to drive a finger terminal.

6. The robot hand according to claim 5, further comprising tension springs provided at an outer side of the joint connection unit and an outer side of the branch connection unit.

\* \* \* \* \*